(12) United States Patent
Cottle et al.

(10) Patent No.: US 11,746,938 B2
(45) Date of Patent: Sep. 5, 2023

(54) CLAMP

(71) Applicant: NORMA Germany GmbH, Maintal (DE)

(72) Inventors: Ben Cottle, Newbury (GB); Mateusz Jarosz, Reading (GB); Belal Akremi, Newbury (GB); Tatjana Rumbauskiene, Cold Ash (GB); Mark Carter, Oxford (GB); Manuel Baudoin, Newbury (GB)

(73) Assignee: Norma Germany GmbH, Maintal (DE)

( * ) Notice: Subject to any disclaimer, the term of this patent is extended or adjusted under 35 U.S.C. 154(b) by 380 days.

(21) Appl. No.: 17/049,154

(22) PCT Filed: Mar. 21, 2019

(86) PCT No.: PCT/EP2019/057078
§ 371 (c)(1),
(2) Date: Oct. 20, 2020

(87) PCT Pub. No.: WO2019/201543
PCT Pub. Date: Oct. 24, 2019

(65) Prior Publication Data
US 2021/0239245 A1 Aug. 5, 2021

(30) Foreign Application Priority Data
Apr. 20, 2018 (DE) ............. 10 2018 109 581.3

(51) Int. Cl.
*F16L 23/08* (2006.01)
*F16L 23/20* (2006.01)

(52) U.S. Cl.
CPC .............. *F16L 23/08* (2013.01); *F16L 23/20* (2013.01)

(58) Field of Classification Search
CPC ........ F16L 21/06; F16L 21/065; F16L 23/08; F16L 23/04; F16L 23/12; F16L 23/20; F16L 23/003; F16L 23/006; F16L 59/184
See application file for complete search history.

(56) References Cited

U.S. PATENT DOCUMENTS 7,399,005 B2 7/2008 Rigollet et al.
9,016,731 B2 4/2015 Rigollet
(Continued)

FOREIGN PATENT DOCUMENTS

DE 3129181 A1 2/1983
DE 60210142 T2 3/2007
(Continued)

OTHER PUBLICATIONS

Japanese Office Action for Japanese Application No. 2020-557165 dated Nov. 2, 2021 (8 pages).
(Continued)

*Primary Examiner* — Aaron M Dunwoody
(74) *Attorney, Agent, or Firm* — REISING ETHINGTON, P.C.

(57) ABSTRACT

The disclosure relates to a clamp having a clamping strip and an annular ring element. The clamping strip has two clamping heads which are interconnected by means of a clamping element, and the ring element is positioned radially within the clamping strip. For simple pre-positioning, the ring element has at least one holding element for supporting on an inner side of the clamping strip, which is offset in an axial direction with respect to the ring element via a fastening section and extends at least in sections outwards in a radial direction.

18 Claims, 3 Drawing Sheets

(56) References Cited

U.S. PATENT DOCUMENTS

| | | |
|---|---|---|
| 9,568,130 B2 | 2/2017 | Henrich et al. |
| 10,634,270 B2 | 4/2020 | Rigollet |
| 2018/0094755 A1* | 4/2018 | Rigollet .................. F16L 23/20 |

FOREIGN PATENT DOCUMENTS

| | | |
|---|---|---|
| DE | 102011116768 A1 | 4/2013 |
| DE | 102014002659 A1 | 8/2015 |
| DE | 102016103687 A1 | 9/2017 |
| FR | 2925647 A3 | 6/2009 |
| JP | 2005511991 A | 4/2005 |
| JP | 2013087952 A | 5/2013 |
| JP | 2013540953 A | 11/2013 |
| KR | 101539251 B1 | 7/2015 |
| KR | 20180037595 A | 4/2018 |

OTHER PUBLICATIONS

English Translation of Japanese Office Action for Japanese Application No. 2020-557165 dated Nov. 2, 2021 (11 pages).
German Office Action for German Application No. 102018109581.3 dated Jun. 13, 2018 (5 pages).
International Search Report and Written Opinion for International Application No. PCT/EP2019/057078 dated Jun. 21, 2019 (11 pages).
English Translation of International Search Report for International Application No. PCT/EP2019/057078 dated Jun. 21, 2019 (2 pages).
Korean Office Action for Korean Application No. 10-2020-7032463 dated Jul. 18, 2022 (10 pages).
English Translation of Korean Office Action for Korean Application No. 10-2020-7032463 dated Jul. 18, 2022 (12 pages).

\* cited by examiner

CLAMP

INTRODUCTION

The disclosure relates to a clamp, in particular a profile clamp, with a ring element, and also to a corresponding ring element and to a line connection arrangement with such a clamp.

A clamp such as a profile clamp can for instance be employed for the fluid-tight connection of two pipe ends which are equipped with radially outwardly directed flanges. To this end, the flanges are positioned relative to one another, and the profile clamp is placed with a clampable, generally two-part or multi-part clamp band onto the flanges. The connection is fixed as a result of clamping of the profile clamp, in that axial and radial holding forces act on the flanges. For this purpose, a clamp band of the profile clamp typically has a U-shaped or a V-shaped cross section, which comes into surface contact with the flanges.

To achieve the desired seal according to an example, a ring element with a ring-shaped sealing region is often inserted between the flanges, said region coming into axial surface contact with both flanges, wherein the sealing action is achieved as a result of the bracing of the flanges.

For an ideal seal, it is suitable for the ring element to be oriented precisely in relation to the flanges. If the ring element is separate and not fastened to the clamp or a flange, it is suitable for a user to handle the clamp, the ring element and the pipes to be connected, such that the installation of the clamp is made difficult.

Several solutions are known for simplifying the positioning of the ring element on the clamp. By way of example, DE 602 10 142 T2 discloses a profile clamp, in the case of which the ring element is fixed by means of deformable fastening clips to the clamp band in a positively locking manner. The fastening clips can in this case be configured in one piece with the ring element and position the ring element radially within the clamp.

DE 10 2011 116 768 A1 proposes providing the ring element with spacers which are arranged so as to be distributed on the circumference, are elastically deformable and bear against a radial inner side of the clamp band under a preload. The ring element is thus held on the clamp band in a force-fitting manner within the profile clamp, the ring element being able to be introduced without tools.

DE 10 2016 103 687 A1 discloses a profile clamp with a clamp band and a ring-shaped ring element, the clamp band comprising two clamping heads which are connected to one another by way of a clamping element. In order to obtain a hold of the ring element on the profile clamp, said hold additionally being secured against rotation, the ring element comprises a radially outwardly extending holding tab which is held on the clamping element.

SUMMARY

It is an object of the disclosure, per an embodiment, to propose a clamp, in the case of which a positioning of the ring element on the clamp and a securing of the ring element against rotation are further improved, and preassembly of the clamp on a flange is possible.

To achieve the abovementioned object per an embodiment, in the case of a clamp, in particular a profile clamp, with a clamp band and a ring-shaped ring element, the clamp band comprising two clamping heads which are connected to one another by way of a clamping element, the ring element being positioned radially within the clamp band, provision is made according to the disclosure for the ring element to comprise at least one holding element for support on an inner side of the clamp band, said holding element being offset in an axial direction in relation to the ring element by way of a fastening portion and extending outward at least partially in a radial direction.

According to the disclosure in an embodiment, it is consequently possible for the ring element to be supported on the inner side of the clamp band, or fixed thereto, by means of one or more holding elements. To this end, the at least one holding element also extends with its fastening portion in an axial direction and is thus offset axially in relation to the ring element. In the case of a ring element which is arranged within the clamp, said ring element thus also lies in an axially eccentric manner in relation to the clamp. As a result, the ring element is arranged in the vicinity of or in contact with one of the flanks of the clamp band, against which said ring element is in any case pressed, for example when the profile clamp is braced on the flanges of the pipe ends. The axial position of the ring element with respect to the clamp thus remains virtually unchanged during this operation. In this case, the holding elements can have different geometries and interact with the clamp band in a positively locking and/or force-fitting manner, said holding elements being elastically deformed in particular during the clamping of the clamp. In this embodiment, it may be advantageous for the holding elements to be configured in one piece with the ring element.

In an embodiment, the clamp band is designed as a profile band and comprises two radially inwardly inclined flanks. During clamping of the clamp, said flanks then come into abutment with the flanks of the pipe ends and bring about not only a radial introduction of force, but also an axial bracing of the pipe ends toward one another.

In an embodiment, the ring element comprises at least one fixing tab which extends axially outwardly from the ring element and possibly in a radially inwardly or outwardly offset manner in relation to the ring element. Such a fixing tab can be configured similarly to an aforementioned holding tab. The fixing tab is configured in one piece with the ring element. Said fixing tab has the function in particular of engaging into a recess of a flank in order to secure the ring element against rotation. The spatial extent of the fixing tab therefore does not need to be very large. As a result of the fixing tab which is arranged so as to be slightly visible optically on an outer side of the ring element and therefore on an outer side of the flange, it is possible for a user to check that the ring element has been inserted correctly even after the two flanges have been connected to one another.

In an embodiment, several, in particular three or more fixing tabs are arranged on the ring element and distributed uniformly over the ring element in a circumferential direction. The use of several distributed fixing tabs makes it possible, firstly, to improve the anti-rotation action and, secondly, to avoid an eccentricity of the ring element. As a result of the engagement of the fixing tabs into the corresponding recesses of a flange, a centering is effected. The centered orientation can subsequently be examined by visually inspecting the fixing tabs at the corresponding recesses, even after the flanges have been connected. In addition, the fixing tabs can then not only bring about an anti-rotation action, but also pre-position the ring element with the clamp in a pre-assembly position on the flange. This simplifies the assembly.

For this purpose, per an embodiment, provision is made for the ring element to be able to be fastened to a line end in a force-fitting manner by way of the fixing tabs. The fixing tabs then bear against the pipe end under tension and thus bring about a pre-positioning of the clamp on the flange. No tools are required for the pre-positioning of the clamp on the flange.

In an embodiment, the at least one fixing tab can be of flat configuration have a substantially rectangular form. This does not preclude edges and/or corners being rounded. The fixing tab is thus easy to manufacture and can be manufactured for example as a partially punched-out, bent portion of the ring element, which could be manufactured based on a sheet metal-like material.

In an embodiment, the ring element comprises at least one positioning tab which extends outwardly, in particular radially, from the ring element through a corresponding opening in the clamp band. In this case, the positioning tab extends obliquely with respect to a tangent bearing against the ring element, that is to say both radially outward and in a circumferential direction. Said positioning tab can in this case be offset axially in relation to the ring element, in particular by the same distance as the holding tabs. Furthermore, the positioning tab is elastically and plastically deformable and can be bent with plastic deformation after being plugged through the corresponding opening. As a result, the ring element can be held captively on the clamp band, wherein, on account of the elasticity of the positioning tab, the ring element can at the same time still be moved to a certain extent in relation to the clamp and thus readily permits clamping of the clamp. For this purpose, the positioning tab can for example comprise at least one kink which can impart a certain elasticity to the positioning tab in order to compensate the clamping movement of the clamp band. In an embodiment, the positioning tab is arranged in the vicinity of a flexible bridge which connects halves of the clamp band to one another and which is generally arranged diametrically opposite the clamping heads. In this case, two positioning tabs are provided, which are arranged on different sides of the bridge. This achieves a secure hold. This embodiment can be used as an alternative to or in addition to preloaded fixing tabs.

In an embodiment, provision is made for at least one of the holding elements to comprise at least one spring portion which extends at least partially in a circumferential direction and radial direction. The holding elements with the spring portions are in this case formed such that they can engage into the clamp band, that is to say contact an inner side of the clamp band between the flanks thereof. The radial spacing from the ring element is in this case selected in such a way that, with positioning springs engaged, the ring element is held by the clamp band in the desired position, approximately in a radially centered position with respect to the clamp band. The holding elements with the spring portions comprise in particular a resilient material, such that they can hold the ring element both with non-clamped and with clamped clamp band. During clamping of the clamp band, the holding elements are consequently radially inwardly deformed in a resilient manner. When using several holding elements which are distributed over the ring element in a circumferential direction, it is also possible to maintain a centered mounting of the ring element relative to the clamp band. Of course, this also means that, conversely, with a ring element which is connected to a flange in a force-fitting manner, the clamp is correspondingly oriented relative to the flange by the holding elements.

In an embodiment, a free end of the spring portion is formed so as to be complementary to an inner contour of the clamp band and bears against an inner side of the clamp band. In this way, firstly, a relatively large contact area is obtained and, secondly, the holding element can also secure the ring element on the clamp in an axial direction.

In an embodiment, the spring portion comprises at least one radially outwardly directed bulge which bears against an inner side of the clamp band. Firstly, the bulge can improve the axial mounting between the ring element and the clamp band. Secondly, a defined contact region with the clamp band can be obtained, such that the effective spring force can thereby be set in a very satisfactory manner. If all of the spring portions are provided with the same bulge at the same relative circumferential position, all of the holding elements are largely provided with the same spring characteristics, such that, as a result of a force equilibrium between the forces of the holding elements, said forces acting from different radial directions, the centering of the ring element is effected.

In an embodiment, the holding element comprises two spring portions which in each case extend from the fastening portion in an opposite circumferential direction. In this case, the positioning springs extend over identical lengths in a circumferential direction, such that the fastening portion is arranged in the center between the spring portions. A radial spring action can be provided through corresponding design of the spring portions extending in the circumferential direction. As a result of the centrally arranged fastening portion, a substantially only radial force then constantly emanates from each positioning spring onto the actual ring element.

In an embodiment, the holding element comprises an elongation at least on one spring portion, said elongation bearing against the inner side of the clamping head. In particular, the two holding elements arranged adjacent to the clamping heads in this case comprise at least one spring portion with such an elongation, which in each case bears against the inner side of one of the clamping heads. Said elongation supports the ring element on the clamping heads and thus provides an anti-rotation action between the ring element and the clamp band.

In an embodiment, the ring element comprises at least one fastening hook which extends radially outwardly from the ring element by way of a radial portion, the radial portion being adjoined by an inwardly bent contact portion which runs at least partially parallel to an outer side of the ring element. Said fastening hook can be used to fasten the ring element to a flange of a pipe end, with the fastening hook engaging over the flange and possibly bearing against the latter under preload. In this way, the ring element and thus the clamp can be pre-positioned reliably on the flange.

In this case, the ring element comprises two fastening hooks which are arranged alongside one another and are arranged in the region of the clamping element. In the region of the clamping element, the clamp band is generally interrupted, such that there is sufficient space there for the fastening hooks, which are thus not in the way of a clamping of the clamp.

In this case, provision is made for the ring element to comprise at least two fastening hooks which are diametrically opposite one another. In particular, one fastening hook is in this case arranged opposite a pair of fastening hooks which are configured in the region of the clamping element. As a result, the ring element is positioned reliably in relation to the flange, with an articulated connection in the form of a bridge generally being provided in the clamp band opposite the clamping element, as a result of which sufficient installation space is also available there for the fastening hook. In this case, the fastening hook can simultaneously serve as anti-rotation safeguard between the ring element and the clamp band in that said hook engages between those parts of the clamp band which are connected to one another by way of the bridge.

In an embodiment, the ring element comprises a sealing region which extends in an axial direction and which tapers in a conical manner. The sealing region is in this case substantially ring-shaped and can be brought into abutment against an inner side of the flange. The ring element thus has an integrated sealing function in order to improve the tightness of the connection between the pipe ends.

In this case, it is suitable for the fixing tab to proceed from a radially inner edge of the sealing region, with the holding tab, and possibly the fastening hook, proceeding from a radially outer edge of the ring element. In this way, it is firstly possible to obtain a reliable pre-positioning of the clamp on the flange, as well as a good seal after clamping of the clamp.

In an embodiment, provision is made for the holding element to be arranged axially on a different side of the ring element to the fixing tab. As a result, the ring element is positioned directly on the flange on which said element is intended to be held by way of the fixing tab, with the clamp being offset to some extent axially in relation to said flange and thus hardly being moved in the axial direction during clamping.

In an embodiment, the sealing region is configured in the form of a ring-shaped sealing element which is connected to the ring element. Compared with the one-piece configuration of sealing region and ring element described above, this configuration may have the advantage that the sealing element can be manufactured for example from a different material to the ring element. In this case, the ring element serves, as it were, for positioning the sealing element and the clamp on the flange of a pipe end.

The object mentioned in the introduction is also achieved, per an embodiment, by a ring element for a clamp, wherein the ring element comprises at least one holding element for support on an inner side of the clamp band, said holding element being offset in an axial direction in relation to the ring element by way of a fastening portion and extending outward at least partially in a radial direction. As a result of the at least one holding element, the ring element is held reliably on the clamp band of the clamp. As explained above, it is also possible for several holding elements to be provided, which are configured as described. Furthermore, the ring element can comprise one or more fixing tabs, one or more positioning tabs, and also fastening hooks.

The object mentioned in the introduction is also achieved, per an embodiment, by a line connection arrangement with a line end at which a flange is configured, a clamp in the above-described configuration being arranged on said flange. The clamp can be pre-assembled on the pipe end or the flange and held there in a not-yet-clamped or barely clamped state until the connection to a second pipe end is established and the clamp is clamped.

In this case, it may be preferred for the flange to comprise at least one circumferential recess into which the at least one fixing tab of the ring element engages. As a result, a positively locking connection is effected between the ring element and a corresponding circumferential recess which is arranged radially on the outside of the flange and which ensures a rotationally secure orientation of the ring element. Furthermore, the fixing tab can be preloaded in order to form a force-fitting connection with the flange.

BRIEF DESCRIPTION OF THE FIGURES

Further features, details and advantages of the disclosure become apparent from the phrasing of the claims and from the following description of exemplary embodiments with reference to the drawings, in which:

DETAILED DESCRIPTION

Figure 1:
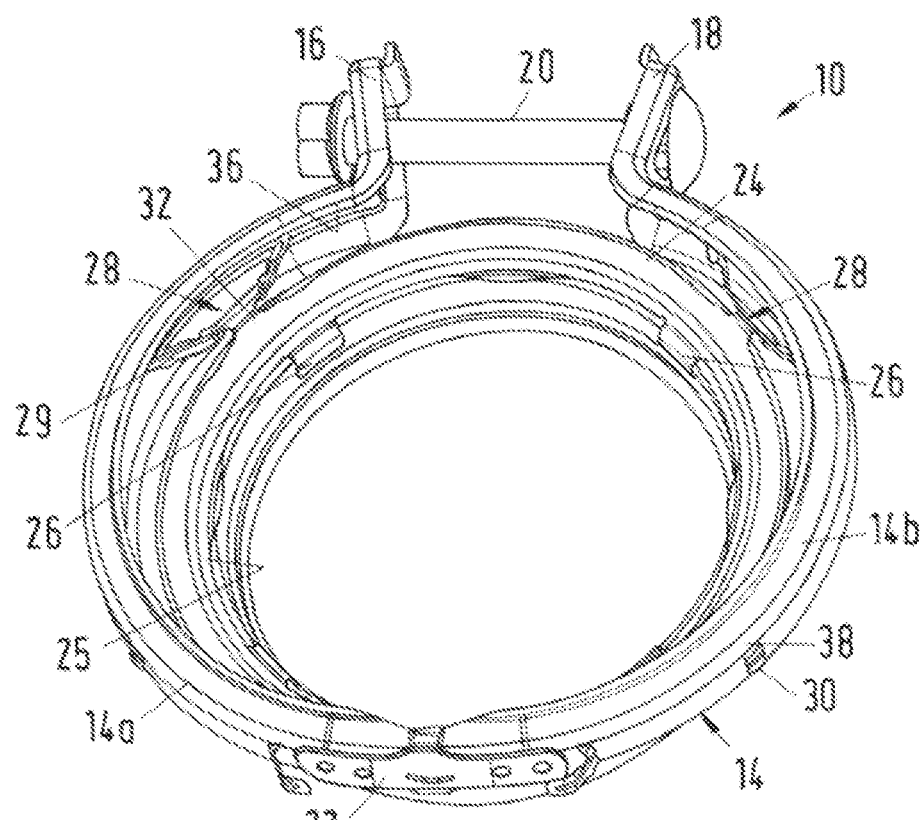
FIG. 1 shows a three-dimensional illustration of a flange with a clamp in the form of a profile clamp.

FIG. 1 shows a clamp 10 according to the disclosure, which is configured in the form of a profile clamp and is pre-positioned on a flange 12 and open, that is to say is not braced. The clamp 10 comprises a clamp band 14 with two clamping heads or clamping jaws 16 and 18, which are connected to one another by way of a clamping element 20 and can be produced by bending the ends of the clamp band 14. However, it is also conceivable for the clamping jaws to be formed for example by ends of the clamp band which have been bent into loops, with clamping bolts being introduced into the loops. In this case, the profile of the clamp band can also deviate to a relatively great extent from the form shown with a substantially V-shaped cross section with two flanks which are radially inwardly inclined from a flat inner side.

The clamp band 14 is subdivided into two profile halves 14a and 14b, which are connected to one another by means of a bridge element 22 on a side which is opposite the clamping heads 16 and 18. This provides a certain elasticity, with the bridge element 22 acting as a joint which permits a relative movement of the two halves 14a and 14b during bracing. The bridge element can in this case also be produced in one piece with the clamp band 14, for example by way of a cutout in the region of the flanks of the clamp band. In this case, a for example three-part configuration of the clamp band is also possible.

A ring element 24 of for example ring-shaped design is arranged within the clamp 10. The ring element 24 comprises holding elements 28, fixing tabs 26, positioning tabs 30 and fastening hooks 50. The fixing tabs 26 will be discussed further below with reference to FIG. 2. The holding elements 28 comprise a fastening portion 32 which adjoins an outer circumference of the ring element 24. The fastening portion 32 extends in an axial direction from the ring element 24. Two finger-like extensions 34 extend in a circumferential direction from said fastening portion in a symmetrical manner, said extensions having an in sections radially outwardly and in sections radially inwardly open, curved form and forming spring portions 29. In total, three holding elements 28 are located on the ring element 24 and are in engagement with an inner contour 36 of the clamp band 14. In this way, the ring element 24 and the clamp band 14 are oriented symmetrically with respect to one another. During bracing of the clamp band 14, the holding elements 28 with the spring portions 29 can compress elastically and in so doing ensure their symmetrical relative position.

The positioning tabs 30 are likewise arranged on the ring element 24 and extend radially outward. Two ends of positioning tabs can be seen in FIG. 1, which pass through openings 38 of the clamp band 14 and are bent on the outer side of the clamp band. This makes a connection between the ring element 24 and the clamp 10 possible, said connection improving the handling of the clamp 10 per this embodiment.

Optionally, it is furthermore possible to employ radially inwardly projecting fingers, which are arranged on an inner circumference of the ring element 24. Said fingers could be elastically deformable and placed on the flange 12 in particular under preload. As a result, a force-fitting hold of the ring element 24 on the flange 12 is additionally produced. The force-fitting hold can also be accomplished by the fixing tabs 26, if desired.

Figure 2:
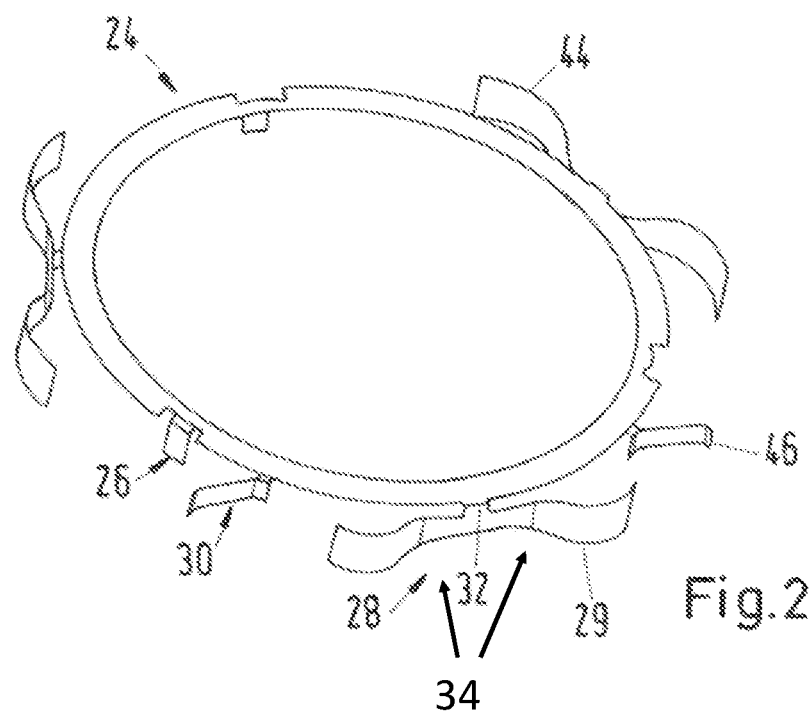
FIG. 2 shows a ring element of a clamp.

FIG. 2 shows a somewhat freed-up illustration of the ring element 24. Here, it is clear that the ring element 24 can be produced on the basis of a sheet metal-like workpiece. The holding elements 28, the fixing tabs 26 and the positioning tabs 30 are configured in one piece with the ring element 24 and can be produced by punching and forming.

By way of example, the holding elements 28 extend, from their fastening portion 32, outwardly in the circumferential direction and in each case have an S form on said section. In this way, two bulges 44 are formed, which project radially further outward than the associated fastening portion 32. When the ring element 24 is inserted or when the clamp band 14 is placed onto the ring element 24, it is consequently possible for a defined surface contact to be produced between the bulges 44 and the inner contour 36 of the clamp band 14. This defined surface contact permits a largely identical spring behaviour of all of the holding elements 28 on the clamp band 14 and leads to a centering of the ring element 24 in the open and closed states of the clamp 10.

A fixing tab 26 is offset in a radially inward manner and is located, in the radial direction, approximately centrally between the outer circumference and an inner circumference of the ring element 24. By way of example, a relatively small, rectangular fixing tab 26 is illustrated, which extends exclusively axially from the ring element 24.

In the flange of the pipe end, it is then possible to provide circumferential recesses 48 whose positions correlate with those of the fixing tabs 26. The ring element 24 can consequently be placed onto the flange 12, such that the fixing tabs 26 reach into the recesses 48 and thus bring about an anti-rotation action.

The positioning tabs 30 extend in an axial direction from the ring element 24 to the same or similar extent as the holding elements 28. In addition, positioning tabs 30 project radially relatively far toward the outside, such that they can project through openings 38 of the clamp band 14. After the positioning tabs 30 have been plugged through the openings 38, an end portion 46 of said positioning tabs can be bent so that a positively locking connection to the clamp band 14 is established. On account of an angled form, it is possible for a positioning tab 30 to compensate for a spacing between the inner contour 36 and an outer circumference of the ring element 24, said spacing being variable on account of the bracing of the clamp 10, by way of elastic deformation.

Figure 3:
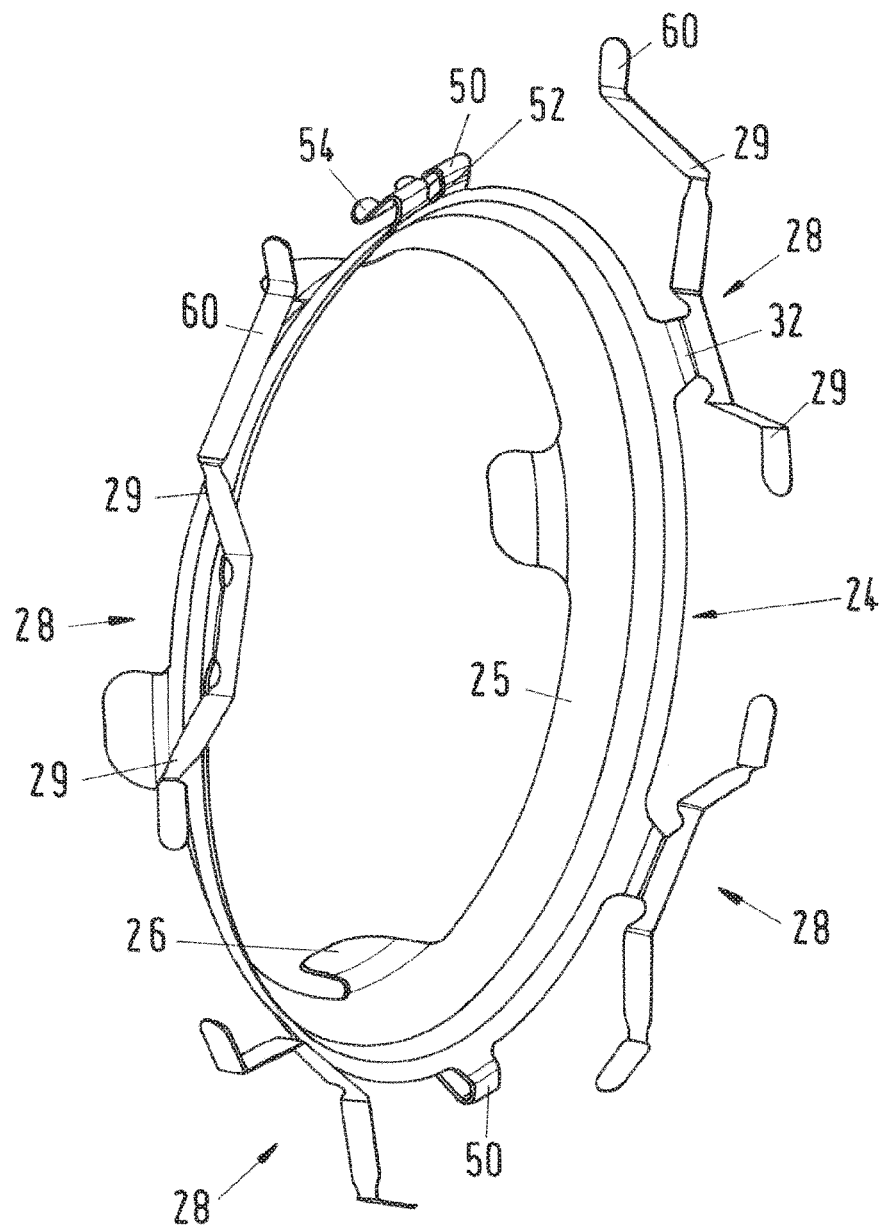
FIG. 3 shows a ring element, with sealing region, of a clamp
Figure 4:
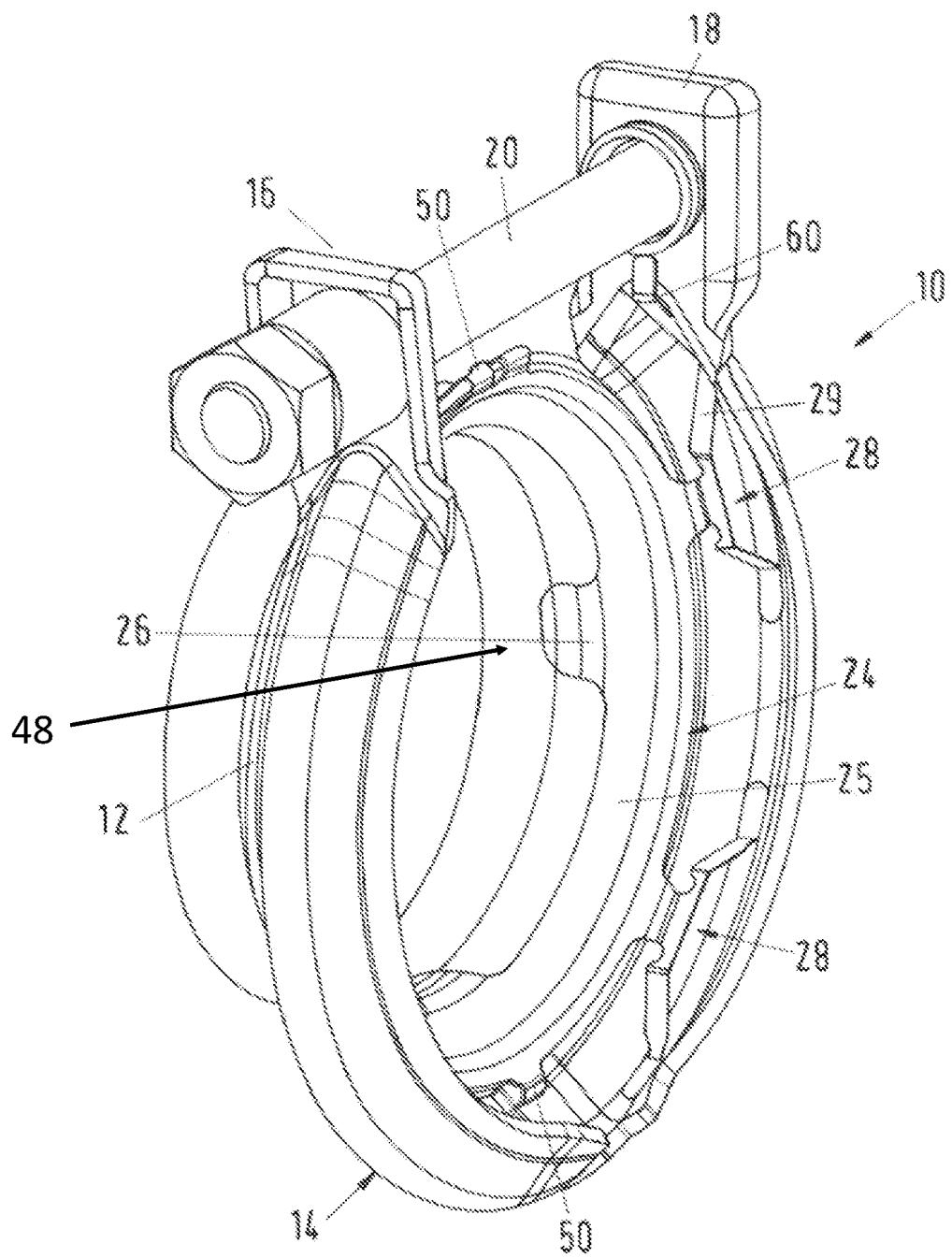
FIG. 4 shows a clamp arranged on a flange of a pipe end.

FIG. 3 then illustrates the ring element 24 with integrated sealing region 25 which forms a conically tapering extension, extending in the axial direction, of the ring element 24. In this case, an inclination of the sealing region 25 corresponds approximately to the inclination on an inner side of the flange, such that said sealing region can be brought into areal abutment against said flange. This is illustrated in FIG. 4.

The fixing tabs 26 in this case proceed from an axial edge of the sealing region 25, whereas the holding elements 28 and fastening hooks 50 are arranged at the opposite axial edge of the ring element 24 and extend in the opposite axial direction. As a result, the fixing tabs 26 pre-position the ring element 24 with the sealing region 25 on the flange, whereas, by way of the holding elements 28 and the fastening hooks 50, the clamp 10 is pre-positioned in relation to the ring element 24 and substantially corresponds already to the position which the clamp 10 assumes after being clamped.

On the holding elements 28 which are arranged, in the assembled state, adjacent to the clamping head 18, the spring portions 29 facing the clamping head is in each case provided with an elongation 60, which can come into abutment on the inside of a respective clamping head and thus brings about an anti-rotation action. The elongation 60 in this case substantially comprises two straight portions, of which the one adjoins the spring portion and transitions into the other, which has a free end and ultimately comes into abutment with the clamping head, as is illustrated for example in FIG. 4. Said elongation 60 thus brings about an anti-rotation action between the ring element 24 and the clamp band 14.

The invention is not restricted to one of the above-described embodiments, but can be modified in many ways.

All of the features and advantages, including structural details, spatial arrangements and method steps, arising from the claims, the description and the drawing can be essential to the invention, both individually and in the various combinations.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE DESIGNATIONS

10 Clamp
12 Flange
14 Clamp band
14a, 14b Clamp band halves
16 Clamping head
18 Clamping head
20 Clamping element
22 Bridge element
24 Ring element
25 Sealing region
26 Fixing tab
28 Holding element
29 Spring portion
30 Positioning tab
32 Fastening portion 34 Finger-like widening
36 Inner contour
38 Opening
44 Bulge
46 End portion
48 Recess
50 Fastening hook
52 Radial portion
54 Contact portion
60 Elongation

The invention claimed is:

1. A clamp comprising a clamp band and a ring-shaped ring element, the clamp band comprising two clamping heads which are connected to one another by way of a clamping element, the ring element being positioned radially within the clamp band, wherein the ring element comprises at least one holding element for support on an inner side of the clamp band, said at least one holding element being offset in an axial direction in relation to the ring element by way of a fastening portion and extending outward at least partially in a radial direction, wherein at least one of the at least one holding elements comprises at least one spring portion which extends at least partially in a circumferential direction and radial direction, wherein the at least one holding element comprises two spring portions which in each case extend from the fastening portion in an opposite circumferential direction.

2. The clamp as claimed in claim 1, wherein the ring element comprises at least one fixing tab which extends axially outwardly from the ring element and in a radially inwardly offset manner in relation to the ring element.

3. The clamp as claimed in claim 2, wherein the at least one fixing tab is of flat configuration and has a substantially rectangular form.

4. The clamp as claimed in claim 2, wherein the holding element is arranged axially on a different side of the ring element to the fixing tab.

5. The clamp as claimed in claim 1, wherein the ring element comprises at least one positioning tab which extends outwardly from the ring element through a corresponding opening in the clamp band.

6. The clamp as claimed in claim 1, wherein a free end of the at least one spring portion is formed so as to be complementary to an inner contour of the clamp band and bears against an inner side of the clamp band.

7. The clamp as claimed in claim 1, wherein the at least one spring portion comprises at least one radially outwardly directed bulge which bears against an inner side of the clamp band.

8. The clamp as claimed in claim 1, wherein the at least one holding element comprises an elongation at least on one spring portion, said elongation bearing against the inner side of the clamping head.

9. The clamp as claimed in claim 1, wherein the ring element comprises at least one fastening hook which extends radially outwardly from the ring element by way of a radial portion, the radial portion being adjoined by an inwardly bent contact portion which runs at least partially parallel to an outer side of the ring element.

10. The clamp as claimed in claim 9, wherein the ring element comprises two fastening hooks which are arranged alongside one another and are arranged in the region of the clamping element.

11. The clamp as claimed in claim 9, wherein the ring element comprises at least two fastening hooks which are diametrically opposite one another.

12. The clamp as claimed in claim 1, wherein the ring element comprises a sealing region which extends in an axial direction and which tapers in a conical manner.

13. The clamp as claimed in claim 12, wherein a fixing tab proceeds from a radially inner edge of the sealing region, the at least one holding element and the fastening hook proceeding from a radially outer edge of the ring element.

14. The clamp as claimed in claim 1, wherein a sealing region is configured in the form of a ring-shaped sealing element which is connected to the ring element.

15. A ring element for a clamp as claimed in claim 1, wherein the ring element comprises at least one holding element for support on an inner side of the clamp band, said holding element being offset in an axial direction in relation to the ring element by way of a fastening portion and extending outward at least partially in a radial direction.

16. A line connection arrangement with a line end at which a flange is configured, a clamp as claimed in claim 1 being arranged on said flange.

17. The line connection arrangement as claimed in claim 16, wherein the flange comprises at least one circumferential recess into which the at least one fixing tab engages.

18. A clamp comprising a clamp band and a ring-shaped ring element, the clamp band comprising two clamping heads which are connected to one another by way of a clamping element, the ring element being positioned radially within the clamp band, wherein the ring element comprises at least one holding element for support on an inner side of the clamp band, said at least one holding element being offset in an axial direction in relation to the ring element by way of a fastening portion and extending outward at least partially in a radial direction, wherein the ring element comprises at least one positioning tab which extends outwardly from the ring element through a corresponding opening in the clamp band.

* * * * *